Nov. 11, 1930.   F. P. GARY   1,781,223
ENDLESS SECTIONAL WATER SCREEN
Filed Nov. 12, 1928   4 Sheets-Sheet 1
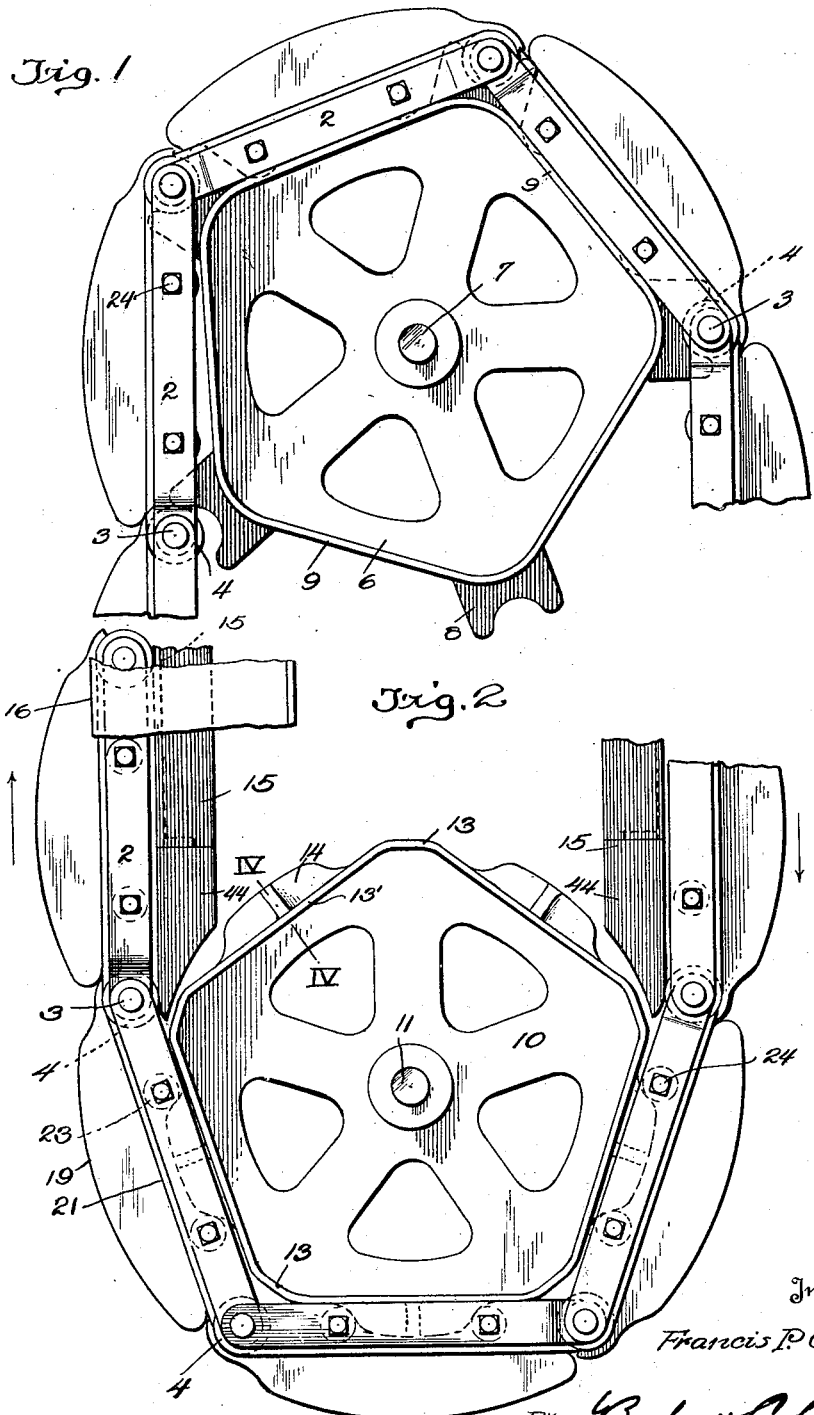

Nov. 11, 1930.   F. P. GARY   1,781,223
ENDLESS SECTIONAL WATER SCREEN
Filed Nov. 12, 1928   4 Sheets-Sheet 2
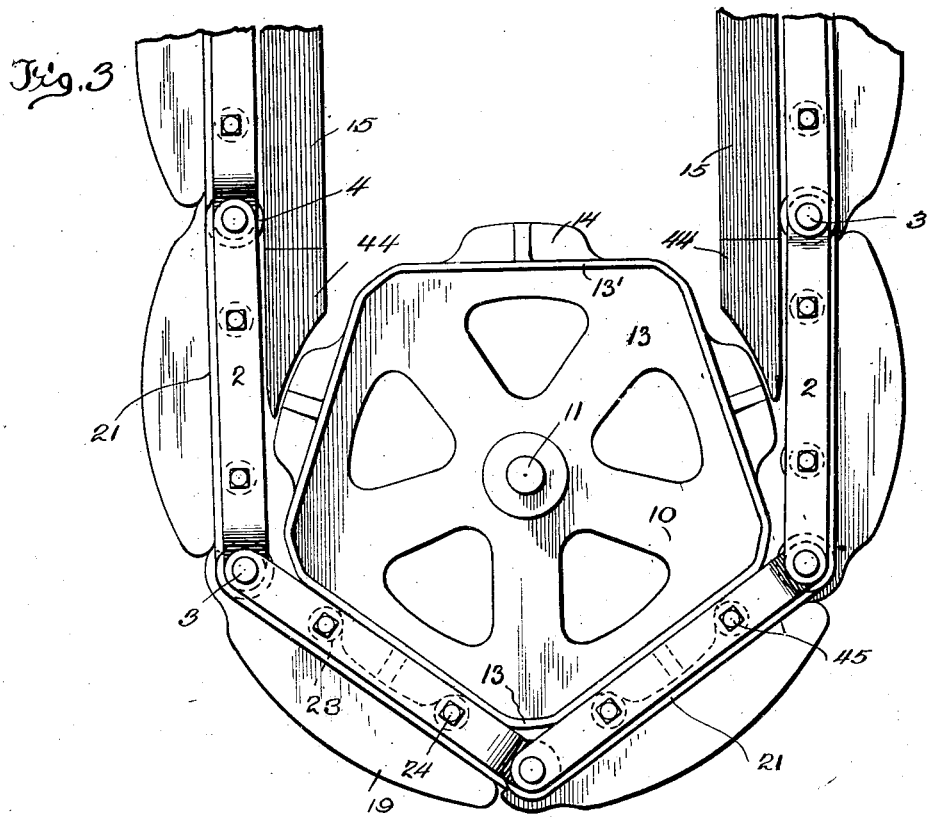
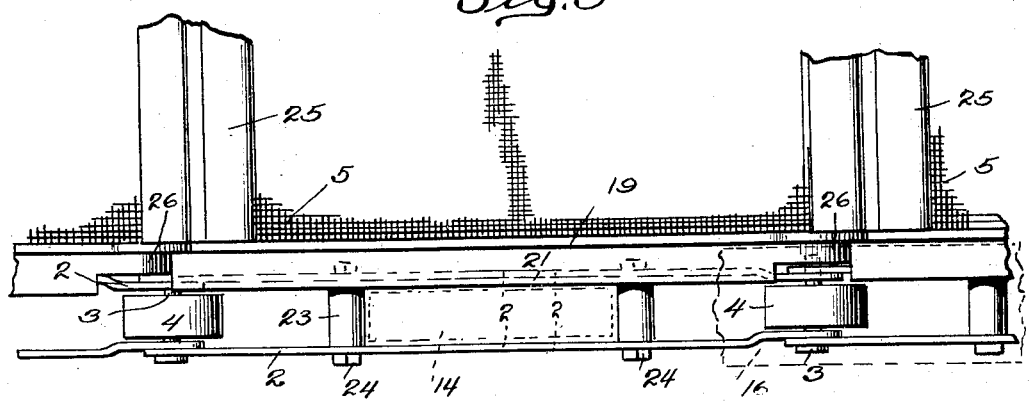
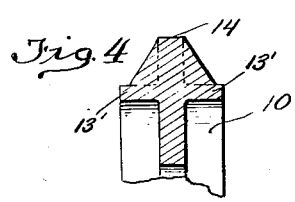
Inventor
Francis P. Gary
By Barker Collings
Attorneys Nov. 11, 1930.   F. P. GARY   1,781,223
ENDLESS SECTIONAL WATER SCREEN
Filed Nov. 12, 1928   4 Sheets-Sheet 3
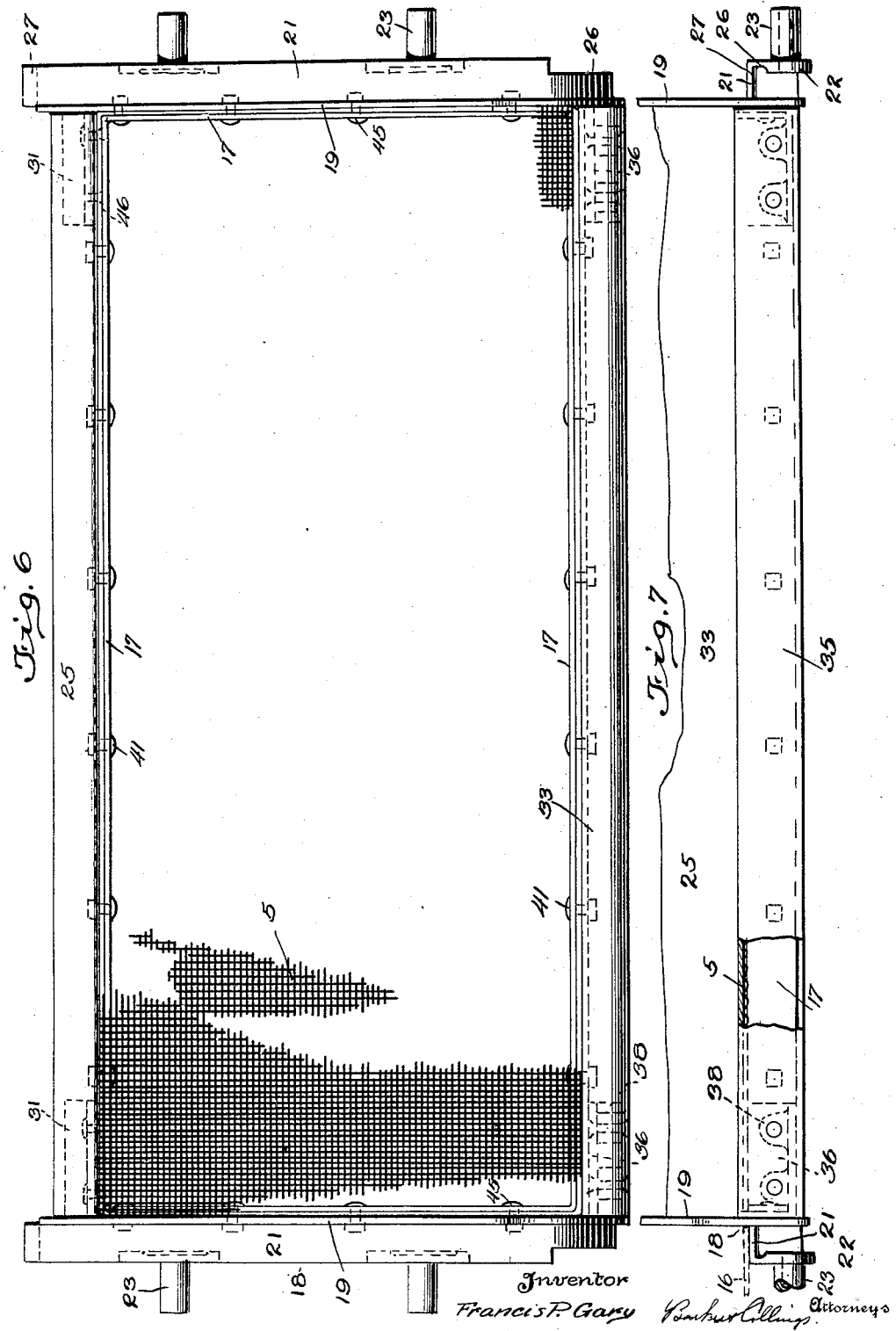
Inventor
Francis P. Gary

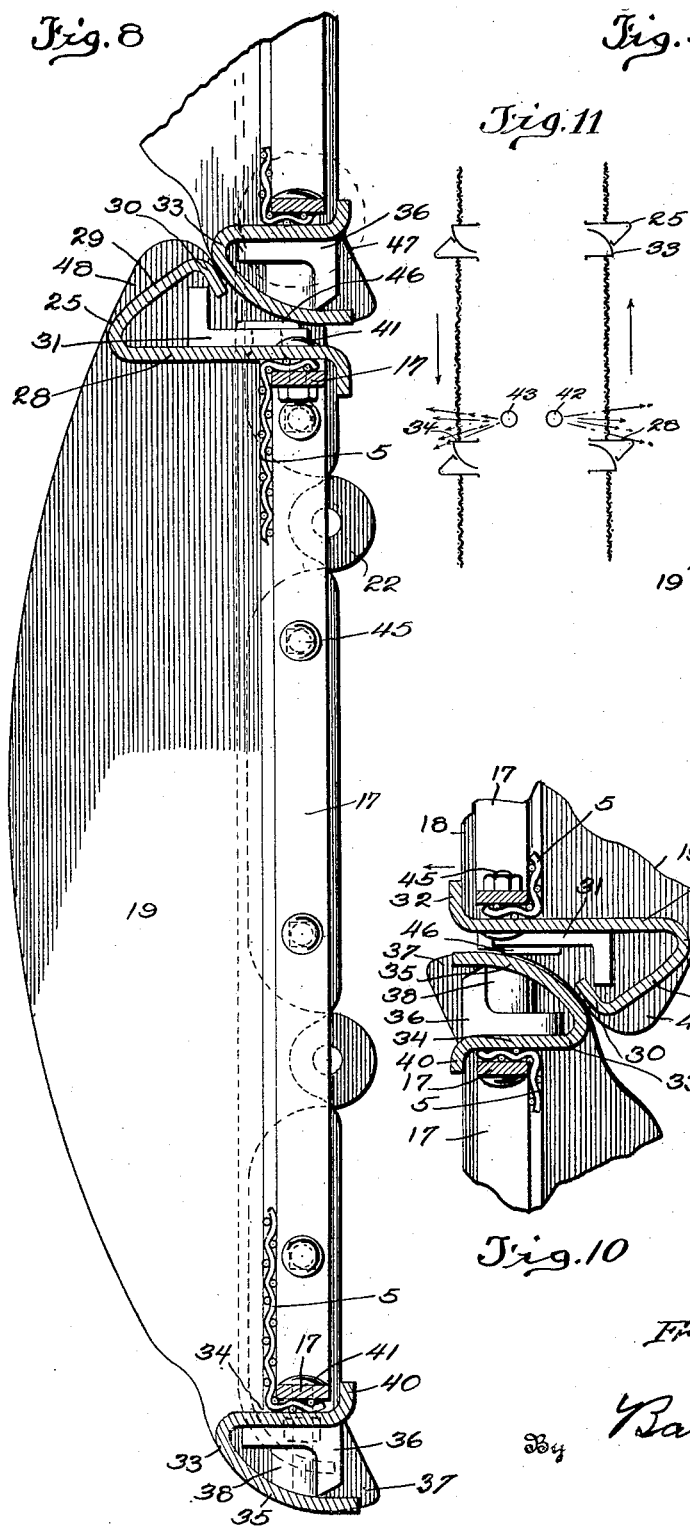

Patented Nov. 11, 1930

1,781,223

UNITED STATES PATENT OFFICE

FRANCIS P. GARY, OF MILWAUKEE, WISCONSIN, ASSIGNOR TO CHAIN BELT COMPANY, OF MILWAUKEE, WISCONSIN, A CORPORATION OF WISCONSIN

ENDLESS SECTIONAL WATER SCREEN

Application filed November 12, 1928. Serial No. 318,964.

The present invention relates to apparatus for screening or roughly filtering water or other liquids; examples of such apparatus to which the present invention may be applied being endless sectional water screens, for treating water for use for industrial purposes taken from a natural stream or other conduit, to remove therefrom such trash or suspended or floating objects as would be objectionable to the uses to which the water is to be put; screens for treating sewage for the removal therefrom of the trash and coarse materials that may be carried thereby; and other screens for similar purposes.

The invention has for its object to improve screens of this character in the particulars to be pounted out in the following specification.

Fig. 1 is a side elevation of the upper portion of a water screen embodying the present invention including one of the head wheels.

Fig. 2 is a side elevation of the lower portion of a water screen embodying the present invention including one of the foot or boot wheels.

Fig. 3 is a view similar to Fig. 2 representing the boot wheel turned to a different position from that shown in Fig. 2.

Fig. 4 is a transverse sectional view through the rim of the wheel taken on the line IV—IV of Fig. 2.

Fig. 5 is a plan view of one end of a short section of a sectional screen embodying the present invention.

Fig. 6 is a plan view of a single section of the screen.

Fig. 7 is an end view of the screen section such as shown in Fig. 6 parts being broken away.

Fig. 8 is a longitudinal sectional view of a short section of the screen.

Fig. 9 is a side elevation of a section of the screen.

Fig. 10 is a transverse sectional view through the adjacent ends of two screen sections represented in working position.

Fig. 11 is a diagrammatic view illustrating means for cleaning the screen by streams of water.

The screen that constitutes the filtering element of the apparatus embodying the invention is endless, and made up of a series of sections pivotally united. Such screen is usually arranged to hang vertically, engaging with head sprocket wheels, and foot sprocket wheels, the former serving as the means for driving the screen and the latter, which are immersed in the body of the liquid being screened or filtered, merely as holding, directing, and turning means. Each screen section is preferably rectangular in shape and is secured at its opposite sides to the links of sprocket chains, these being preferably formed of separate side bars 2, 2, united at their ends by pivot pins 3, upon which latter and between the side bars are the rollers 4. In the present illustrated embodiment of the invention the screening members are formed of wire fabric 5 of suitable mesh.

The head wheels 6 if the mechanism are supported upon a shaft 7 which is suitably driven from a source of power not illustrated. These head sprocket wheels are preferably five-sided and are formed with teeth, 8, located at the angles of the wheels and projecting therefrom so as to be adapted to enter between the side bars of the links and to engage with the rollers, 4, as represented in Fig. 1. The peripheral edges of the wheels 6 between the sprocket teeth 8 are preferably straight and formed with side flanges 9 upon which rest the edges of the side bars of the chain links as the latter engage with the wheels.

The boot wheels 10 are supported upon a shaft 11 and these and the boot, in which the lower loop or turn of the endless screen operates, are in the bottom of the chamber or conduit for the liquid being treated, in which the screen is located. The wheels 10 serve merely to hold the lower portion of the screen in proper position and support the same while the screen is making its lower turn. They are preferably constructed somewhat differently from the head wheels and are illustrated in Figs. 2 and 3. Instead of having sprocket teeth that engage with the chains at their joints, they are truncated at the angles, as indicated at 13, so that when the chains engage therewith the rollers 4 lie somewhat away from the wheels, while the edges of the links rest upon side flanges 13', extending along the straight peripheral faces of the wheel. Sprockets 14 project outwardly, centrally from the peripheral sides of the wheels, and are arranged to enter between the side bars of the links and engage with intermediate cross members to be later described in detail, as represented in Figs. 2, 3 and 5.

The screen thus far described has many features in common with screens such as illustrated in Patent 1,208,655 dated December 12, 1926 to B. S. Reynolds, and Patent 1,514,673 dated November 11, 1924 to G. R. Roddy, both assigned to Chain Belt Company of Milwaukee, Wisconsin. The present invention is in the nature of improvements upon water screens of the type illustrated in the said patents. These patents show stationary guards located at the sides of the screen and arranged to prevent the flow of unscreened water from the inlet past the screen without first passing through the screening sections thereof and also stationary guides for controlling and steadying the movements of the screen between the head and foot or boot wheels, while the screen is in operation. The material removed from the water by the screen lodges upon the surfaces of the screening sections and is thereby lifted from the water and is subsequently removed from the screen at suitable points above the surface of the liquid by means of streams of water or of air, brushes, or other means that may be chosen for this purpose.

Referring again to the drawings, 15 indicate stationary guides with which engage the rollers 4 of the chains, serving to guide and steady the traveling screen in its movements.

16 indicates the stationary guards located along the paths of movement of the screen between the supporting wheels 6 and 10, which guards serve as elements of seals which operate to prevent trash or other refuse from passing around the sides of the screen or through the chains and into the flowing stream of filtered, cleansed, water.

As will be seen by reference to the drawings, Figs. 2, 5 and 7 the free edges of the guards 16 extend inwardly sufficiently far toward the screen sections and from the supporting members to which the guards are secured to overlie and cover the chains.

As already stated the sections of the screen consist of baskets or frames that carry the screening surfaces 5 and the preferred construction of such baskets will now be described. They are rectangular in shape with a projecting lip along one edge, that serves on the up run of the screen to receive and carry such refuse material as is taken from the water by the screen, but which falls away therefrom as the screen surfaces successively rise above the surface of the liquid being filtered, and which therefore would fall back into the liquid except for such projecting lips.

Referring particularly to Figs. 5 to 10 there is represented a rectangular frame formed of bars 17 suitably united, upon the outer edges of which frames lie the screen sheets 5; and when the latter are formed of woven wire fabric their edges are turned over the outer edges of such frame pieces 17, and downward against the outer faces thereof. To the side of each frame 17 is secured an attachment, preferably in the form of a metal casting comprising a side bar 18, of a length approximately that of the side bar of a chain link to which frame the side attachment is secured, as by bolts 45. The bar 18 of the attachment is formed with an extension 19 that projects outwardly beyond the surface of the screen 5 in a plane approximately at right angles thereto, when the attachment is secured in place, the outer edge of such extension being curved on a radius corresponding to that of the bottom of the boot in which the lower turn of the endless screen is made. The extensions 19, one at each side of each screen section, working in combination with the curved bottom of the boot, serve to prevent the passage of water and refuse material that might be carried thereby from the body of unscreened liquid around the ends of the screen sections and into the body of screened liquid at the lowermost submerged end of the screen. The sprockets or projections 14 of the wheels, which have already been described, cooperate in preventing leakage or passage of unscreened liquid at this portion of the screen. These latter features of the apparatus, serving to prevent the passage of unfiltered water in the boot of the apparatus, do not constitute a part of this present invention.

Extending laterally outwardly from the bar 18 of the side attachment and at right angles thereto is a flange 21 of a length substantially equal to that of the attachment. This flange is provided with one or more depending brackets 22 which carry hollow studs 23, adapted to lie between the side bars of a chain link and to be secured thereto by bolts 24, that pass through the perforations in the side bars and the holes in the studs 23. There is thus formed a very advantageous connection of the screen section and basket to the chain links, such connection being to both the side bars of the links, so that any strains transmitted to the chains in the working of the apparatus are transmitted equally to both side bars of each chain, thus preventing unequal strains at the joints of the chains due to unequal loading of the side bars thereof which has heretofore been a frequent source of trouble in operating endless sectional water screens of the type to which the present invention relates. The studs 23 constitute intermediate cross bars between the side bars of the link, and with such cross bars the sprocket projections 14 of the boot wheels 10 directly engage see Fig. 5.

The outwardly and laterally projecting flanges 21 are arranged to move in close proximity to the inner faces of the overhanging or inwardly projecting guards 16 Fig. 7, forming close running joints therewith and serving as trash guards to prevent the passage of refuse material around the sides of the screens.

Endless traveling screens have heretofore been provided with running sealing joints at their edges consisting of stationary guards such as those designated 16 herein, the edges of which are brought close to the sides of the screen baskets, such as the side plates 19 herein, the joints of the seal thus formed being between these two parts. It has been found in practice, however, that, in setting up and operating endless traveling screens of large sizes, it is practically impossible to so operate them that they hang perfectly vertical, and because of this it frequently happens that the guards are worn away along their free edges by the engagement of the moving parts of the screen therewith, and that such wear becomes sufficiently great to open spaces between the guards and the moving screen sections by baskets wide enough to permit passage of material that the screen is supposed to remove from the water, around the ends of the screen and into the filtered water. The sealing joints are therefore, by the present arrangement, made between parallel faces, one of which is the overhanging guard and the other the opposing parallel face of the flange 21, and it is entirely practicable to make these faces of sufficient extent to allow for a very considerable amount of wear without increasing the size of the open spaces between these parts.

One end of the outwardly projecting flange 21, preferably the forward end, is curved downwardly or, as represented at 26, while the opposite end is beveled on its surface toward the chain, as represented at 27. When the screen sections are coupled together and in working position the beveled end 27 of one section lies close to the outer face of the curved end 26 of the next adjacent section, thus forming a close working trash joint between these parts. It should be understood that the curvature of the end portion 26 of the flange is on an arc struck from the pitch line of the chain at the joint of articulation of the adjacent links.

There is a transverse attachment provided at each end of each screen basket, extending between the side pieces 18. One of these attachments, 25, constitutes the lifting lip of a screen basket, that receives and carries such refuse taken from the water by the screen as may fall back from the screening surface 5 on the up run thereof. This lip is preferably formed from a piece of sheet metal bent, as indicated in the drawings, to form a transverse end wall 28 for the basket or screen section, extending outwardly from the screening surface 5 to approximately the edges of the extensions 19 of the side attachments, where the ends of the transverse lifting lip abut the inner faces of such extensions 19; a curved wall 29 extending rearwardly from the outer edge of the wall 28, and a forwardly curved flanges 30 at the end of the rearwardly extending wall 29. The transverse lifting lip which has just been described is secured in place preferably by being attached to brackets 31 extending inwardly from the side attachments of the screen basket, near the rear ends thereof, by means of bolts 46. The inner edge of the wall 28 of the lifting lip is bent forwardly as indicated at 32 and underlies the edges of the bars 18 of the side attachments of the screen baskets.

At the forward end of each basket and between the edge plates 19 thereof is located a transverse attachment 33. This consists of a plate 34 from the outer edge of which extends a curved portion 35, the outer face of which is concentric with and lies close to a face of the flange 30 of the transverse lifting lip end piece, both these parts, 30 and 35, being curved on arcs struck from the center of the adjacent joint of articulation of the connected screen baskets carrying respectively the transverse parts 25 and 33. This insures that when these united screen sections articulate in their working movements there will be maintained between the cross end attachments thereof close working joints to constitute trash seals under all conditions and positions of operation.

The transverse end attachments 33 are secured in place by being united to brackets 36 extending inwardly from the forward ends of the side attachments of the screen baskets. These brackets are preferably formed each with a flat wall against which rests the plate 34, and with forwardly extending hollow bosses 38 through which pass bolts employed to unite the transverse pieces to the bracket 36, the ends of the bosses resting against the inner face of the curved portion 35 of the transverse piece, which they support. The inner end of the transverse attachment 33 is bent to form a flange 40 which engages with the inner edges of the side pieces of the screen baskets.

The outer extending side plates 19 of the side attachments of the screen baskets are formed with extensions 37 and 48. The extensions 37 are toward the forward ends of the baskets and are located opposite the ends of the transverse attachments 33, thus covering the latter, and their forward edges are preferably concentric with the curved outer face of the part 35 of the cross attachment 33.

The extensions 48 at the rear of the side pieces are opposite the ends of the transverse lifting lip attachment 25, and the rear edges of such extension are curved to be concentric with the edges of the extensions 37 of the sides of the baskets which are pivotally connected therewith, as indicated in Figs. 8, 9 and 10 thus forming close trash seals where the side plates or attachments of the screen baskets come together.

I prefer that the metallic screen fabric 5 should rest upon the outer edges of the rectangular frame formed of the bars 17, as represented in Fig. 8, that is upon the edges of the frame most distant from the chains of the apparatus; and that the folded-over edges of the said screening material should lie between the said frame pieces 17 and the side and end attachments of the screen baskets, these latter parts being united to the rectangular frame by bolts 41, which operate to unite the parts in clamping engagement with the edges of the screening fabric. This manner of securing the screen fabric leaves the joints between such fabric and the bounding edge walls of the baskets outside of the plane of the screening surface so that such joints may be easily washed out and kept clean.

It is common practice to clean the screen sections by means of streams of water discharged from spray pipes arranged at the rear or inner sides of the screens and located in suitable positions above the surface of the body of liquid in which the screen operates. These spray pipes are sometimes located so that the streams they discharge act upon the up moving screen sections, and sometimes so they act upon the down-moving screen sections, the former arrangement being commonly referred to as a front spray cleaner and the latter as a rear spray cleaner. Both these arrangements are sometimes used in a single apparatus and that arrangement is represented in connection with the present invention in Fig. 11.

42 indicates a front spray pipe and 43 a rear spray pipe. From this view, which is largely diagrammatic in character, it will be seen that the arrangement of the cross pieces 25 and 33 and their relation to the screening surface 5 is such that the screens will be easily and effectively cleaned quite to the angles between the screen surfaces and the said cross members, since there are no ledges not reached by the cleansing streams from the spray pipes that would operate to form pockets in which material taken from the water may accumulate. By reference to the last mentioned view it will be seen that that the surface of the wall 28 of the rear transverse piece 25, which constitutes the lifting lip of the screen basket, is a flat shelf across which the streams of water from the spray pipe 42 are discharged, and that such streams act upon the said surface from edge to edge, that is from the junction of said surface and the surface of the screen, so that there is no opportunity for lodgment of material at the angle between these two parts. Likewise in the descending movements of the screen sections the streams of cleaning water from the spray pipe 43 shoot across surface 34 of the end piece of the attachment 33, acting thereon from edge to edge and leaving no pockets for lodgment and accumulation of material. This feature of construction and arrangement by which the screen sections may be effectively cleansed through the instrumentality of streams of wash water from spray pipes has been found to be of decided practical advantage as compared with arrangements heretofore in vogue where great difficulty has been experienced in removing the material taken up by the screens that happens to lodge in the angles around the outer edges of the screening surfaces.

The construction of traveling screen which has been described operates to very effectively seal the moving parts against the passage of trash or other refuse around the ends of the screen baskets and into the stream of cleansed water. The trash seals formed by the stationary guards 16 and the movable flanges 21 carried by the screen baskets are effective during the up and down runs of the screen, while the edge sealing plates 19 at the sides of the screen baskets, operating in conjunction with the curved bottom of the boot, effect the desired sealing where the lower turn of the screen is made. The side seals, consisting of the guards 16 are dispensed with where the lower turn of the conveyer is made because the boot wheels 10 serve to guide and direct the screen at this portion of its travel and hold the parts thereof in proper and accurate relationship, permitting edge seals such as have been mentioned to be relied upon.

By reason of the construction of the lower or boot wheel 10 as has been described it is possible to carry the guides such as 15, with which the rollers 4 of the chain engage, very close to the lower sprocket wheels, as will be seen by reference to Figs. 2 and 3, where 44 indicates an extension of the guide 15 terminating close to the boot wheel 10. By reference to the drawings it will be apparent that when one of the chain rollers 4 leaves the end of the guide 44 it is in position opposite and at some distance from the truncated portion 13 of the boot wheel 10, Fig. 2 being in the position it occupies during the time that the chain is in engagement with and being directed by said wheel. When the roller 4 leaves the guide piece 44 the side bars of the link in advance of such roller have already seated themselves upon the flanges 12 of the boot wheel, and the sprockets 14 of such wheel have entered between the side bars of said link and come into working engagement with the studs 23.

It will be seen that the point where the extension 44 of the guide 15 terminates is distant, on a radial line from the axial center of the wheel 10, equal to the distance from such center to the near peripheral face of the transverse articulating portion of the links (in the embodiment of the improvement described such part being the roller 4) of a chain the links of which are properly seated upon the wheel with its links in engagement with the side flanges 13' thereof.

The trash or refuse seals at the ends of the screen sections, such as those between the parts 30 and 35, and between the edges of the parts 37 and 48 may well be designated articulating seals to distinguish them from the seals at the sides of the screen such as those formed by the parts designated 21 and 16.

For convenience in description that face of a screening section upon which the refuse material collected is deposited is termed the outer or top face; the parts that extend beyond such screening surface and around the edges thereof, such as the walls 19, 28 and 34, are sometimes referred to as vertical walls or surfaces, while the side flanges 21, referred to as being horizontal, indicate that they are at right angles to the plates 19 adjacent to which they are located. These terms of description are employed merely to facilitate description, and those terms especially that would ordinarily indicate direction are not intended as terms of limitation.

The manner in which the screens 5 are supported upon the frames 17, and the particular construction of the transverse attachments 25 and 33 and their combination to form transverse trash seals, herein illustrated and described, are not claimed in this application but are made the subject of another application by me, about to be filed as a continuation, in part, of this present application.

Claims:

1. An endless sectional water screen comprising parallel chains and screen baskets secured to the chains, characterized by such baskets having projecting flanges adapted to form trash seals at the sides of the screen, and means carried by said flanges for connecting them with the chains.

2. An endless sectional water screen comprising a plurality of parallel chains; guides for said chains; a plurality of screen baskets, having projecting flanges at their sides coacting with said guides to form trash seals which are parallel to the plane of the screen surface; and means carried by said flanges for securing them to said chains.

3. An endless sectional water screen comprising parallel chains and screen baskets, characterized by such baskets being provided with side attachments formed with forwardly extending walls the outer edges of which are curved, and with laterally extending flanges extending outward beyond the said baskets adapted to form trash seals at the sides of said baskets which are parallel to the plane of the screen surface, and means for uniting such flanges directly to the links.

4. An endless sectional water screen comprising parallel chains and screen baskets, characterized by the baskets carrying laterally projecting flanges, constituting elements of trash seals which are parallel to the plane of the screen surfaces; the ends of such flanges being shaped to constitute articulating trash seals at the ends of the screen baskets concentric with the axial lines about which the sections articulate.

5. An endless sectional water screen comprising parallel chains and screen baskets, characterized by the baskets carrying laterally projecting flanges serving to form trash seal elements at the edges of the screens on the up and down runs thereof, said seals being parallel to the plane of the screen surface, the ends of the side flanges of adjacent screen baskets being brought close together and shaped to constitute articulating seals, the joints of which are concentric with the pivots of the chains.

6. An endless sectional water screen comprising endless chains and screen baskets, characterized by the baskets being formed with vertical sealing plates at the sides of the screen, the ends of the plates carried by adjacent baskets being brought close together and shaped to constitute articulating end seals concentric with the joints of the chain.

7. In an endless sectional water screen, pivotally united screen sections, comprising rectangular frames; screen surfaces carried thereby; side attachments, having horizontal flanges constituting trash seals at the side edges of the screen sections, which are parallel to the plane of the screen surface and inwardly extending brackets; and cross attachments, at the ends of the sections, secured to the brackets of the end attachments, and arranged to constitute articulating seals at the ends of the sections.

8. In an endless sectional water screen, pivotally united screen sections, comprising rectangular frames; screen surfaces secured thereto; side attachments, having horizontal flanges constituting trash seals at the side edges of the screen sections, which are parallel to the plane of the screen surface, means extending from the horizontal flanges by which the screen sections may be secured to sprocket chains, and inwardly extending brackets; and cross attachments, at the ends of the sections, secured respectively to the brackets of the end attachments; the end sections of adjacent pivotally united sections being arranged to constitute articulating, transverse trash seals between the sections.

9. An endless, moving, sectional water screen comprising a series of pivotally united screen sections, sprocket chains connected to the sections at their edges, sprocket wheels over which the chains run and by which it is directed and caused to turn, one set of wheels being above the body of liquid to be treated by the screen and the other immersed in such body, guides with which the chains engage for directing the up and down movements of the screens between the upper and lower sprocket wheels, and trash seals at the edges of the screens following the course of the said guides through the body of liquid, characterized by the chains of the screen having transverse parts arranged intermediate the pivotal connections uniting the chain links, the immersed sprocket wheels being provided with sprocket like projections that engage with the said intermediate parts of the chain between their pivots and with peripheral surfaces upon which the chains rest while in engagement with the said sprocket wheels, the portions of the wheel opposite to which the pivotally united portions of the chain links lie when in engagement with the sprocket wheels being truncated, whereby the pivotally connected ends of the chain links stand away from the wheels, and the guides with which the chain engage being carried into close proximity to the periphery of the lower immersed wheels, and substantially to the horizontal plane of the axis of said wheels so the chains pass therefrom into immediate engagement with the wheels substantially as shown and described.

10. An endless water screen comprising screen sections pivotally connected so as to be free to articulate one relative to the other, the sections of the screen being provided with outwardly extending sealing members located in planes that are substantially parallel to the planes of the screening surfaces of the sections, the ends of such lateral extensions of contiguous, united sections being brought close together and shaped to form articulating, laterally extending, trash seal joints concentric with the axes of articulation of the screen.

11. In an endless sectional water screen adapted to be partially immersed in a body of liquid which it is to cleanse, the combination of an upper driving sprocket wheel; a lower immersed guiding and turning wheel; a sprocket chain working in engagement with the said wheels, having transverse projections concentric with the axes of articulation of the links of the chain adapted to be engaged by the sprocket teeth of the upper driving wheel, and other transverse projections carried by the chain links, located between the axes of articulation of the links and arranged to engage with the sprocket teeth of the lower submerged sprocket wheel, whereby the articulated ends of the links of the chain when in engagement with the said lower wheel stand out from the wheel, at a distance from the axis thereof greater than the distance of the projections which are engaged by the sprocket teeth of the wheel from said axis; screen baskets carried by the chain, and a guide for the chain, located between the sprocket wheels, the lower end of the guide terminating close to the peripheries of the sprockets of the said lower wheel and at a distance from the axial center of the wheel approximately the same as the distance from such center to the articulating portions of the chain when in working engagement with the wheel.

12. An endless water screen such as described in claim 11, in which the lower sprocket wheel is polygonal in shape, the sprockets of the wheel projecting out from the intermediate portions of the plane peripheral edges of the wheel and the portions of the wheel between said plane parts, and opposite to which the pivotally united portions of the chain links lie when in engagement with the wheel, being truncated.

In testimony whereof I affix my signature.

FRANCIS P. GARY.